US007151267B2

(12) United States Patent
Lemer

(10) Patent No.: US 7,151,267 B2
(45) Date of Patent: Dec. 19, 2006

(54) METHODS AND DEVICES FOR MEASURING THE ACTIVITY OF A RADIOISOTOPE

(75) Inventor: Pierre-Marie Lemer, Nantes (FR)

(73) Assignee: Lemer Protection Anti-X par Abreviation Societe Lemer Pax, Carquefou (FR)

( * ) Notice: Subject to any disclaimer, the term of this patent is extended or adjusted under 35 U.S.C. 154(b) by 190 days.

(21) Appl. No.: 10/497,797

(22) PCT Filed: Dec. 5, 2002

(86) PCT No.: PCT/FR02/04195

§ 371 (c)(1),
(2), (4) Date: Jun. 7, 2004

(87) PCT Pub. No.: WO03/048807

PCT Pub. Date: Jun. 12, 2003

(65) Prior Publication Data

US 2005/0029465 A1 Feb. 10, 2005

(30) Foreign Application Priority Data

Dec. 6, 2001 (FR) .................................. 01 15762

(51) Int. Cl.
*G01T 1/00* (2006.01)
*G01T 3/00* (2006.01)
*G01T 1/18* (2006.01)

(52) U.S. Cl. .................. 250/393; 250/390.03; 250/374
(58) Field of Classification Search ................ 250/393, 250/390.03, 374
See application file for complete search history.

(56) References Cited

OTHER PUBLICATIONS

Patent Abstracts of Japan, vol. 1999, No. 5, May 31, 1999 & JP 11 052061 A (Aloka Co Ltd), Feb. 26, 1999 abstract; figure 1.

*Primary Examiner*—David Porta
*Assistant Examiner*—Mindy Vu
(74) *Attorney, Agent, or Firm*—Young & Thompson

(57) ABSTRACT

A method of measuring the activity of a radioisotope (3) placed in an ionisation chamber (1) consists in:—determining the energy spectrum of the radiation emitted by the radioisotope;—automatically comparing the energy spectrum with a set of pre-recorded or pre-programmed radioisotope energy spectra in such a way as to identify the radioisotope present;—subsequently, automatically directing the calibration coefficient corresponding to the radioisotope present to the electronic measuring elements in order to obtain the appropriate activity measurement. The invention provides a totally automatic activity measurement. Moreover, the invention also relates to an activity meter with radioisotope recognition which is used to obtain an automatic activity measurement. The device employs one or more scintillation—or semi-conductor-type radiation detectors (10) for determining the energy spectrum of the radioisotope present.

13 Claims, 1 Drawing Sheet

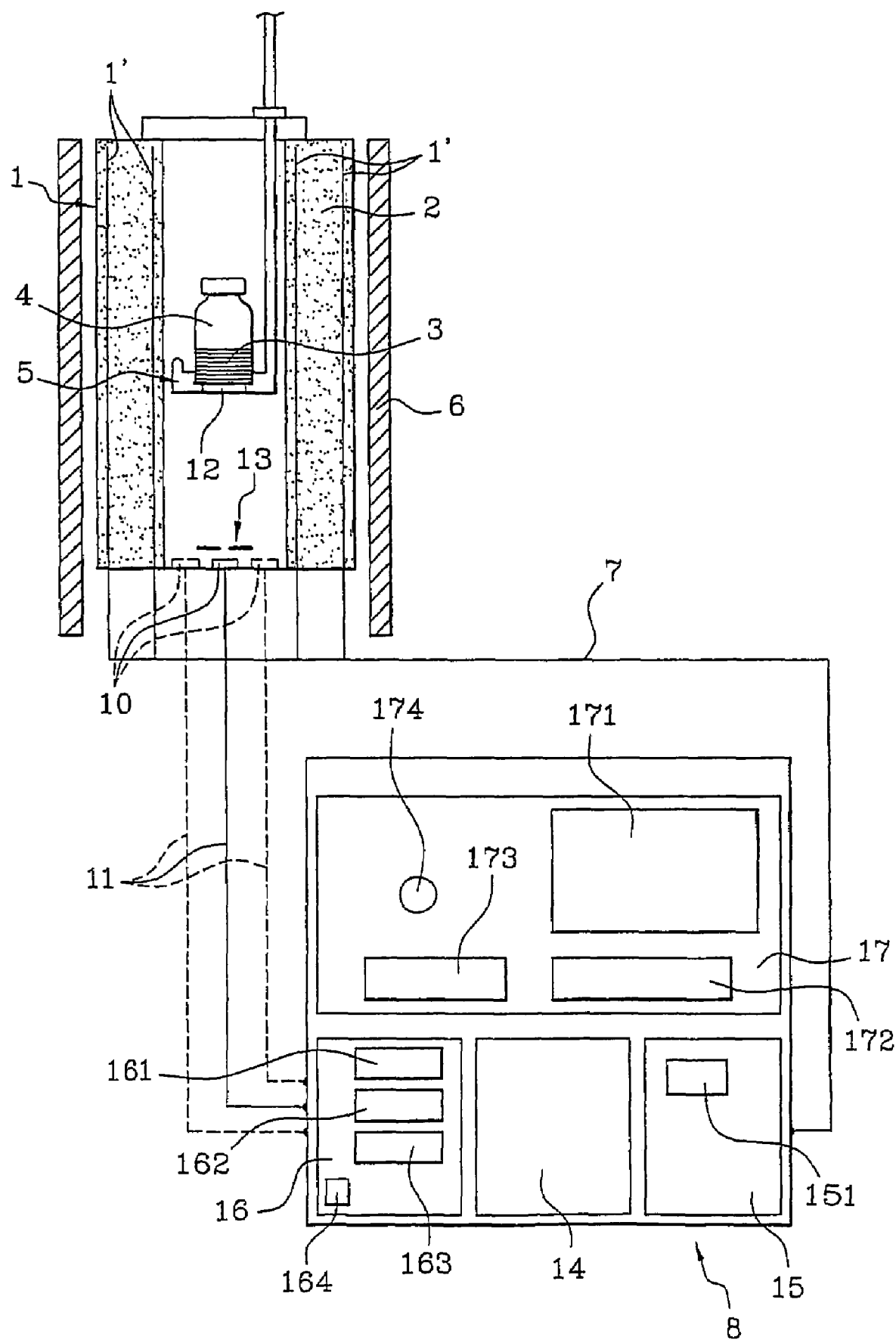

METHODS AND DEVICES FOR MEASURING THE ACTIVITY OF A RADIOISOTOPE

The present invention relates to the general field of radioactive radiation-emitting products or sources. It relates more precisely to a method and to an instrument for measuring the activity of a radio-isotope, in particular but non exclusively of the type of those implemented in the field of nuclear medicine for the preparation of radioactive injectable solutions necessary to the realisation of scintigraphies, or for the preparation of radioactive products used in metabolic radiotherapy for treating certain cancers.

One uses currently instruments which are called <<a activity meters>> or <<radionuclide calibrator>>, notably for measuring the activity of radioactive sources which emit gamma radiations, within an energy range of a few tens of KeV to several MeV, or beta radiations whereof the energy is greater than 1.5 KeV. One of the main applications of this kind of instrument is the calibration of radio-pharmaceutical doses injected to the patients in nuclear medicine, but they can also be used for other radio-isotopic activity measuring applications, notably in the industrial laboratories or the research centres.

These activity meters are formed of a well-type gas ionisation chamber, wherein is introduced the isotope to be measured. This chamber delivers a current proportional to the activity of the isotope tested; it is connected to a control and processing electronic/computerized unit which converts such current into voltage, processes the signal and provides an indication (in Curie or Becquerel) of the measurement of the activity of the isotope.

The activity measurement depending on the energy spectrum of the radiation emitted by the radionuclides, the activity meters current available on the market offer manual selection of the isotopes to be measured, among a pre-recorded or pre-programmed list, in order to allocate to the processing electronics the appropriate calibration coefficient corresponding to the radio-isotope at hand, to obtain the adequate activity measurement.

Selection is made either by touch buttons or from a menu on a computer console.

The gamma-emitting isotopes used most frequently in nuclear medicine, and therefore pre-selectable, are Tl 201, Tc 99$^m$, Ga 67, In 111, I 123, I 131, F 18, C 11 . . . , all within the gamma radiation energy range of 70 KeV–511 KeV; but other isotopes (or energy ranges) may be introduced or programmed.

However, the necessity of selecting manually the isotope before measuring its activity involves risks of error which lead to an erroneous measurement of the activity.

The purpose of the present invention is to solve this problem by dispensing with the corresponding manual selection and making such selection automatic.

To this end, the radio-isotopic activity measuring method according to the present invention, consisting in placing the radio-isotope in an ionisation chamber capable of providing a current proportional to the activity of said radio-isotope tested, then, using electronic means for processing the signal, consisting in converting the value of the current into an activity value, by using a calibration coefficient corresponding to the radio-isotope at hand, is characterised in that it consists:

in determining the energy spectrum of the radiation emitted by the radio-isotope placed in the ionisation chamber, in comparing automatically this energy spectrum with a set of energy spectra of pre-recorded or pre-programmed radio-isotopes, in order to identify the radio-isotope at hand, then in allocating automatically to the electronic signal processing means, the calibration coefficient corresponding to said radio-isotope at hand, in order to obtain the adequate activity measurement.

According to another characteristic, to secure the operation, the method according to the present invention consists, when the measured spectrum of the radio-isotope under analysis does not correspond to any of the pre-recorded or pre-programmed spectra, in activating automatically a visual and/or sound alarm, in order to provide the activity value sought only after manual programming and/or selection of the radio-isotope at hand.

In order to solve the problem explained above, the invention also relates to a radio-isotopic activity measuring instrument, of the type comprising an ionisation chamber connected to electronic means for controlling and processing the signal capable of providing an indication of the activity introduced into said chamber by using a calibration coefficient corresponding to the radio-isotope at hand.

According to the present invention, this instrument comprises:
means for analysing the energy spectrum of the radio-isotope affected,
means for comparing automatically the energy spectrum analysed with a set of pre-recorded or pre-programmed spectra, in order to identify the radio-isotope at hand, and
means for allocating automatically to the electronic signal processing means, the calibration coefficient corresponding to said radio-isotope at hand, to obtain the adequate activity measurement.

Still according to the invention, the means for analysing the energy spectrum of the radio-isotope are formed of at least one detector of the scintillation or semi-conductor type, associated with electronic and computerised signal processing means, the photosensitive surface of said detector(s) being placed in the flux of the primary radiation emitted by the radio-isotope placed in the ionisation chamber.

The corresponding detector(s) may be associated with means which enable to limit the flux of the primary radiation emitted by the radio-isotope which strikes its photosensitive surface, in order to improve the analysis conditions of the spectrum of the radio-isotope at hand. These flux limitation means may consist of a diaphragm-type system, either with variable aperture or with fixed aperture.

According to another particularity, the instrument according to the present invention includes a plurality of different detectors (in their nature or in their diaphragm equipment) in order to increase the possibilities of identification of the radio-isotopes analysed, and the diversity of the radio-isotopes identifiable within a wider pre-defined energy range.

According to a preferred embodiment, the corresponding detector(s) are at the bottom of the ionisation chamber; the support of the container of radio-isotopes is then fitted with a bottom at least partially radio-transparent, so that the flux of the primary radiation emitted by the radio-isotope may strike the photosensitive surface of the detector(s).

According to another particularity, to simplify and secure the instruments, information or alert means are provided, which will be activated in case when the spectrum analysed of the radio-isotope at hand does not correspond to any of the pre-recorded or pre-programmed spectra, as well as means of man-machine interface type to enable manual selection of the radio-isotope at hand.

Other aims and advantages of the present invention will appear when reading the following description in conjunction with an embodiment solely given for exemplification and non limiting purposes.

The understanding of this description will be facilitated while referring to the appended drawing, wherein the single figure is a schematic representation of an activity meter according to the present invention.

The activity meter illustrated on the appended figure comprises a well-type ionisation chamber 1 composed of a double cylindrical enclosure containing a radiosensitive 2. In the double enclosure, one notices the presence of electrodes 1' enabling to collect the current produced. Inside the well of the chamber 1, the radio-isotope 3 whereof the activity will be measured, is positioned within an iso-sensitivity zone. The radio-isotope 3 is placed in a radio-transparent container 4 which maintains the former in the iso-sensitivity zone by means of an adjustable support 5. This radio-isotope 3 may be either in liquid form, and in such a case it is contained in a flask (as illustrated on the appended figure) or in a syringe, or in solid form, and in such a case it may be integrated to a pharmacy-type gelule digestible by the patient.

The ionisation chamber 1 is surrounded with a shield 6 made of radio-attenuating material (for example lead). This shield 6 is intended for protecting, on the one hand, the operators against the radiations emitted by the radioactive source 3 tested, and, on the other hand, the chamber 1 itself against the possible ambient radioactivity liable to distort the measurements of activity.

The ionisation chamber 1 with its accessories is here represented schematically, whereas its structure, form and dimensions may vary according to the products available on the market.

This ionisation chamber 1 is connected by the cable 7 to an electronic/computerized unit 8 for processing the signal in order to provide an indication of the activity of the radio-isotope 3, while using a calibration factor or coefficient corresponding to the type of radio-isotope tested.

Within the framework of conventional activity meters, this calibration coefficient is defined on the basis of a manual selection of the type of radio-isotope placed in the ionisation chamber, among a list of several pre-defined and recorded radio-isotopes.

Contrary to that, the present activity meter has the possibility of recognising, by itself, the type of the isotope introduced into the measuring chamber, and on the basis of that identification, it has the capacity to choose automatically the calibration coefficient appropriate to the type of the isotope affected.

To do so, taking into account that each radionuclide is characterised by its own energy spectrum, the instruments include:
  means for conducting an energy spectrometry of the radiation emitted by the radio-isotope 3, and in particular for assessing the energy of the photo-electric peak(s) characteristic of the isotope. These means are formed of at least one radiation detector 10 connected by the cable 11 to signal processing means integrated to the electronic unit 8,
  means for identifying the radio-isotope 3 by comparison of the spectrum analysed with a sampling or a pre-programmed or pre-recorded library of the spectra characteristic of the radio-isotopes liable to be analysed, and
  means for allocating automatically to the activity measuring means, the appropriate calibration coefficient.

The detector(s) 10 are selected to enable the determination of the energy spectrum of the radiation of the radio-isotope examined, according to the energy range usable pour the activity meter.

The corresponding usable detectors may be either scintillation detectors (for example NaI, CsI, KI, ZnO . . . ) coupled to photodiodes or photomultipliers, or semi-conductor detectors (for example CdTe, CdZnTe . . . ); they are chosen depending on the activity ranges to be measured and the energy spectra to be identified.

The efficiency of these detectors is quite often limited to reduced energy ranges. A single detector may be used when working on a reduced energy range; conversely, for a widespread energy range, it is advisable to use a plurality of different detectors, chosen according to the characteristics of each of them, in order to enable better coverage of the energy range contemplated.

The detector(s) 10 are laid out so that their photosensitive surface is stricken directly by the primary energy flux coming from the radio-isotope 3 introduced into the ionisation chamber 1.

Preferably, such detector(s) 10 are placed inside the ionisation chamber 1. It may be contemplated to attach it(them) to the internal wall of the ionisation chamber or to insert it(them) in such wall, but still preferably and for practical reasons, it is or they are positioned at the bottom of the chamber, as represented on the appended figure.

If needed, the supporting base 5 of the radio-isotope container 4 includes a few adaptations in the form of radio-transparent zone(s) (aperture(s) or appropriate material) in order not to disturb the transmission of the energy flux from the radio-isotope 3 to the photosensitive surface of the detector(s) 10. To that effect, on the appended figure, one notices the presence of an aperture 12 provided at the bottom of the supporting base 5.

Generally speaking, the quality of the data transmitted by the detectors 10 may be affected by the high activities of the radio-isotope 3. For certain structures of detectors, and/or for certain applications, in order to optimise the operation, it may be interesting to limit the flux of the primary radiation which strikes the photosensitive surface of the detector. This flux limitation means may be in the form of a diaphragm 13, either with variable aperture, or with fixed aperture, as the case may be.

In case when several radiation detectors 10 are available, all the detectors at hand receive the radiation of the isotope and enable to obtain an energy spectrum whereof the resolution is more or less correct. The electronic processing means are then adapted for comparing all the spectra obtained with the library of pre-recorded spectra, in order to enable the identification of the isotope under analysis. If required, several different spectra of the same radio-isotope, according to the activity thereof, may be pre-recorded to increase the possibilities of identification.

The electronic/computerized unit 8 is structured and programmed correctly to fulfil the functions defined above.

In a more detailed fashion, and as illustrated on the appended figure, such unit 8 may comprise several specific modules, i.e.: a general management module 14, an input/output (I/O) module 15 dedicated to the processing of the signal coming from the ionisation chamber 1, an input/output (I/O) module 16 dedicated to the processing of the signal coming from the detector(s) 10, and a man-machine interface (MMI) module 17.

The general module 14 comprises advantageously a central processing unit (<<CPU>>) and associated memories. Its purpose is to manage the general tasks and ensure the control of the whole facility. For a nuclear medicine department or practice, this module may enable, generally speaking, the preparation and the management of the medical tests, the back-up of the results on files, the outsourcing and the preparation of the doses to be administered, the management of the radio-pharmaceutical products . . .

The I/O module 15 processes the signal coming from the ionisation chamber 1 by the cable 7. When the radiosensitive gas 2 is subjected to the radiation of the radio-isotope 3, the ionisation chamber 1 provides the I/O module 15 with a current proportional to the activity of said radio-isotope. A suitable electronic control and processing unit 151 converts such current into voltage, processes the signal and provides an indication in Curie or in Becquerel of the measurement of the activity of the radio-isotope 3. To this end, the electronic control and processing unit uses the own calibration coefficient of the radio-isotope 3, as determined by the I/O module 16.

The I/O module 16 dedicated to the spectrometry is informed by the detector(s) 10 by dint of the cable(s) 11. II comprises an electronic control and processing unit 161 capable of defining the photo-electric peak(s) characteristic of the radio-isotope 3; it includes means 162 for automatic comparison between the energy spectrum measured and the content of a library 163 of pre-recorded radio-isotopic spectra corresponding to the different isotopes which the device is liable to characterise, these means of comparison enabling to lead to the identification of the radio-isotope affected. It also includes means 164 for automatic allocation to the module 15, of the calibration coefficient corresponding to the radio-isotope affected, in order to obtain the adequate activity measurement.

The man-machine interface 17 enables to inform and/or alert the operator. It also enables him to launch programmes and to inform the device. This man-machine interface 17 includes a screen 171 enabling to visualise general information or related to the radio-isotope 3 subject of the measurements, as well as alert and/or error messages; it also includes a keyboard 172 enabling to launch programmes and to answer interrogations, as well as possible a button box 173 and means of alert 174 of the sound and/or luminous type.

As regards the problems of recognition or of determination of the radio-isotope at hand, the programming of the module 16 is adapted to accept a few small differences between the measured spectrum and the corresponding pre-recorded spectrum, this difference being all the same adapted for a faultless recognition certainty.

In case when the spectrum(spectra) analysed by the instrument does(do) not correspond to any of the pre-recorded spectra, or if the resolution of the spectrum(spectra) analysed is insufficient, the man-machine interface 17 will trigger an information message or implement the alert means 174, and the activity measurement will only be carried out after manual selection or identification of the radio-isotope, by means of a button box 173 or of the keyboard 172.

It should be noted that the processing module of the current emitted by the ionisation chamber 1 may be placed directly under the chamber properly speaking, this to avoid transporting corresponding very small currents over rather long distances (a few decimetres, possibly a few metres), which might account for the background noise.

On the other hand, the energy spectrum analysed by the detector(s) 10 may be disturbed by the conditioning of the sources. Consequently, the identification of the isotopes takes advantageously their conditioning into account (for example, the activity meter will have to distinguish between Tc 99$^m$ flask, Tc 99$^m$ syringe, as well as Tc 99$^m$ gelule, and three different spectra corresponding to these three configurations ought to have been pre-recorded).

The invention claimed is:

1. A method for measuring the activity of a radio-isotope, comprising the steps of:
   placing said radio-isotope (3) in an ionization chamber (1) capable of providing a current proportional to the activity of said radio-isotope tested, and
   then, using electronic means for processing the signal (15), in converting the value of the current into an activity value, by using a calibration coefficient corresponding to the radio-isotope at hand, by the steps of
   1) determining the energy spectrum of the radiation emitted by the radioisotope (3) placed in the ionisation chamber (1),
   2) comparing automatically the determined energy spectrum with a set of energy spectra of pre-recorded or pre-programmed radio-isotopes, in order to identify the radio-isotope at hand, then
   3) allocating automatically to the electronic means for processing the signal (15), the calibration coefficient corresponding to said radio-isotope at hand, to obtain the adequate activity measurement.

2. A method according to claim 1, further comprising:
   activating automatically at least one of a visual and a sound alarm, when the measured spectrum of the radio-isotope (3) under analysis does not correspond to any of the pre-recorded or preprogrammed spectra, and
   operation of means to enable manual selection of the radio-isotope at hand.

3. The method of claim 1, wherein, determining the energy spectrum of the radiation emitted by the radio-isotope (3) placed in the jonisation chamber (1), does not include determining half-life.

4. An instrument for measuring the activity of a radio-isotope, which instrument comprises an ionization chamber (1) connected to electronic means for controlling and processing the signal (15) providing an indication of the activity introduced into said chamber (1), by using a calibration coefficient corresponding to the radio-isotope at hand (3), characterised in that it comprises:
   means (10, 11, 161) for analyzing the energy spectrum of the radio-isotope affected (3),
   means (162) for comparing automatically the energy spectrum analysed with a set of pre-recorded or pre-programmed spectra (163) in order to identify the radio-isotope at hand, and
   means (164) for allocating automatically to said electronic means for processing the signal (15), the calibration coefficient corresponding to said radio-isotope at hand, to obtain the adequate activity measurement.

5. An instrument according to claim 4, characterised in that the means for analyzing the energy spectrum of the radio-isotope (3) are formed of at least one detector (10) of the scintillation or semi-conductor type, associated with electronic and computerized means for processing the signal (161), the photosensitive surface of said detectors (10) being placed in the flux of the primary radiation emitted by the radio-isotope (3) placed in the ionization chamber (1).

6. An instrument according to claim 5, characterised in that it includes at least one detector (10) enabling measurement of the energy spectrum of radio-isotopes, associated with means (13) which enable to limit the flux of the primary radiation emitted by the radio-isotope which strikes its photosensitive surface, to limit the radiation received by said detector (10) and improve the analysis conditions of the spectrum of the radio-isotope at hand.

7. An instrument according to claim 6, characterised in that it includes at least one detector (10) enabling measurement of the energy spectrum of radio-isotopes, associated with a variable aperture diaphragm (13).

8. An instrument according to claim 6, characterised in that it includes at least one detector (10) enabling measurement of the energy spectrum of radio-isotopes, associated with a fixed aperture diaphragm (13).

9. An instrument according to claim 5, characterised in that it includes information or alert means (171, 174) activated in case when the spectrum analysed of the radio-isotope at hand does not correspond to any of the pre-recorded or pre-programmed spectra, and means (172, 173) to enable manual selection of the radio-isotope at hand.

10. An instrument according to claim 4, characterised in that it includes a plurality of different detectors (10) enabling measurement of the energy spectrum of radio-isotopes, in order to increase the possibilities of identification of the radio-isotopes analysed.

11. An instrument according to claim 4, characterised in that it includes at least one detector (10) enabling measurement of the energy spectrum of radio-isotope placed at the bottom of the ionization chamber (1), the support (5) of the container (4) of radio-isotope (3) being fitted with a bottom at least partially radio-transparent, so that flux of the primary radiation emitted by the radio-isotope may strike the photosensitive surface of said detectors (10).

12. The instrument of claim 4, wherein,
the means (10, 11, 161) for analyzing the energy spectrum of the radio-isotope affected (3) does not include means for determining half-life.

13. A instrument for measuring the activity of a radio-isotope, comprising:

an ionization chamber (1) configured for receiving and testing a radio-isotope (3) at hand, flux of primary radiation emitted by the radio-isotope at hand striking onto a photosensitive surface of a detector, and providing a current signal proportional to activity of the radio-isotope at hand for the detector;

a manual selection part to indicate the radio-isotope at hand; and a module connected to the ionization chamber receiving and processing the current signal including converting a value of the current into an activity value by using a calibration coefficient corresponding to the radio-isotope at hand, wherein, the module determines the energy spectrum of the radiation emitted by the radio-isotope (3) at hand, the module compares automatically the determined energy spectrum with a set of energy spectra of pre-recorded or pre-programmed radio-isotopes, in order to identify the radio-isotope at hand, and the module activates automatically at least one of a visual and a sound alarm, when the measured spectrum of the radio-isotope (3) under analysis does not correspond to any of the pre-recorded or preprogrammed spectra.

* * * * *